United States Patent [19]

Hinderks

[11] Patent Number: 4,465,154

[45] Date of Patent: * Aug. 14, 1984

[54] VEHICLE GAS EXTRACTOR

[76] Inventor: Mitja V. Hinderks, 15 Adamson Rd., London NW3, England

[*] Notice: The portion of the term of this patent subsequent to Apr. 27, 1993 has been disclaimed.

[21] Appl. No.: 244,235

[22] Filed: Mar. 16, 1981

Related U.S. Application Data

[63] Continuation-in-part of Ser. No. 533,522, Jun. 29, 1979, abandoned, which is a continuation of Ser. No. 790,887, Apr. 26, 1977, abandoned.

[51] Int. Cl.³ .................. B60K 13/06; F01N 7/00; B62D 35/00
[52] U.S. Cl. .................. 180/89.2; 180/296; 180/309; 180/903; 237/123 A; 237/44; 296/1 S
[58] Field of Search .......... 180/89.2, 309, 296, 180/54 A, 903; 237/12.3 R, 12.3 A, 44; 296/1 S, 95 R, 91

[56] References Cited

U.S. PATENT DOCUMENTS

| | | | |
|---|---|---|---|
| 857,084 | 6/1907 | Lull | 180/84 |
| 1,110,040 | 9/1914 | Chatain | 180/89.2 X |
| 1,214,897 | 2/1917 | Clarke | 180/89.2 X |
| 1,299,326 | 4/1919 | Gray | 181/236 |
| 1,439,717 | 12/1922 | Smith | 237/31 |
| 1,447,749 | 3/1923 | Beselin | 180/89.2 X |
| 1,483,354 | 2/1924 | Kopper | 181/38 |
| 1,506,947 | 11/1925 | Skelton | 180/64 A |
| 1,743,581 | 1/1930 | Williams | 237/12.3 A X |
| 1,867,802 | 7/1932 | Bogert | 296/1 R |
| 1,989,675 | 2/1935 | Bobo | 181/239 |
| 2,199,883 | 5/1940 | Ishiuata | 296/1 S |
| 2,242,494 | 5/1941 | Wolf | 296/1 S X |
| 2,270,115 | 1/1942 | Eliot | 181/263 |
| 2,599,809 | 6/1952 | Branch | 296/95 R |
| 2,725,944 | 12/1955 | Lee | 296/1 S |
| 2,841,232 | 7/1958 | Loeffler | 180/89.2 |
| 2,992,035 | 7/1961 | Tell et al. | 180/89.2 X |
| 3,591,229 | 7/1921 | Wilfert | 296/1 S |
| 3,596,974 | 8/1971 | Adams | 296/1 S |
| 3,618,998 | 11/1971 | Swauger | 296/1 S X |
| 3,685,615 | 8/1972 | Rutt | 181/239 |
| 3,776,587 | 12/1973 | Oxlade | 296/1 S |
| 3,791,468 | 2/1974 | Bryan, Jr. | 180/903 |
| 3,929,369 | 12/1975 | Blair | 296/1 S |
| 3,952,823 | 4/1976 | Hinderks | 180/309 |
| 4,079,984 | 3/1978 | Powell | 296/1 S |

FOREIGN PATENT DOCUMENTS

| | | | |
|---|---|---|---|
| 653840 | 12/1937 | Fed. Rep. of Germany | 180/89.2 |
| 1242178 | 8/1960 | France | 180/54 A |
| 679115 | 9/1952 | United Kingdom | 237/12.3 R |

Primary Examiner—Joseph F. Peters, Jr.
Attorney, Agent, or Firm—Stevens, Davis, Miller & Mosher

[57] ABSTRACT

An airfoil-shaped silencer is on the roof of a vehicle used for pulling a payload, such as a tractor-trailer combination. The leading edge of the silencer is lower than the trailing edge of the silencer. The trailing edge of the silencer includes an elongate discharge aperture which extends in the direction of the width of the vehicle. The silencer is connected to an exhaust pipe, which may pass through the body of the vehicle to provide climate control.

8 Claims, 4 Drawing Figures

VEHICLE GAS EXTRACTOR

CROSS-REFERENCE TO RELATED APPLICATIONS

This application is a continuation-in-part of Ser. No. 533,522 filed June 29, 1979, which in turn is a continuation of Ser. No. 790,887 filed April 26, 1977, both now abandoned.

BACKGROUND OF THE INVENTION

The present invention is directed to an exhaust gas silencer which is mounted on the roof of a surface vehicle which pulls a payload, such as a tractor-trailer combination.

The principles and construction of the silencer per se are set forth in U.S. Pat. No. 3,952,823, the disclosure of which is incorporated herein by reference. Generally, the silencer is used to reduce the load imposed on an engine in pumping gases through the engine exhaust system. The silencer is shaped so that air flowing past the silencer will extract exhaust gases through a gas exit which is a long narrow aperture.

DETAILED DESCRIPTION OF THE INVENTION

Figure 1:
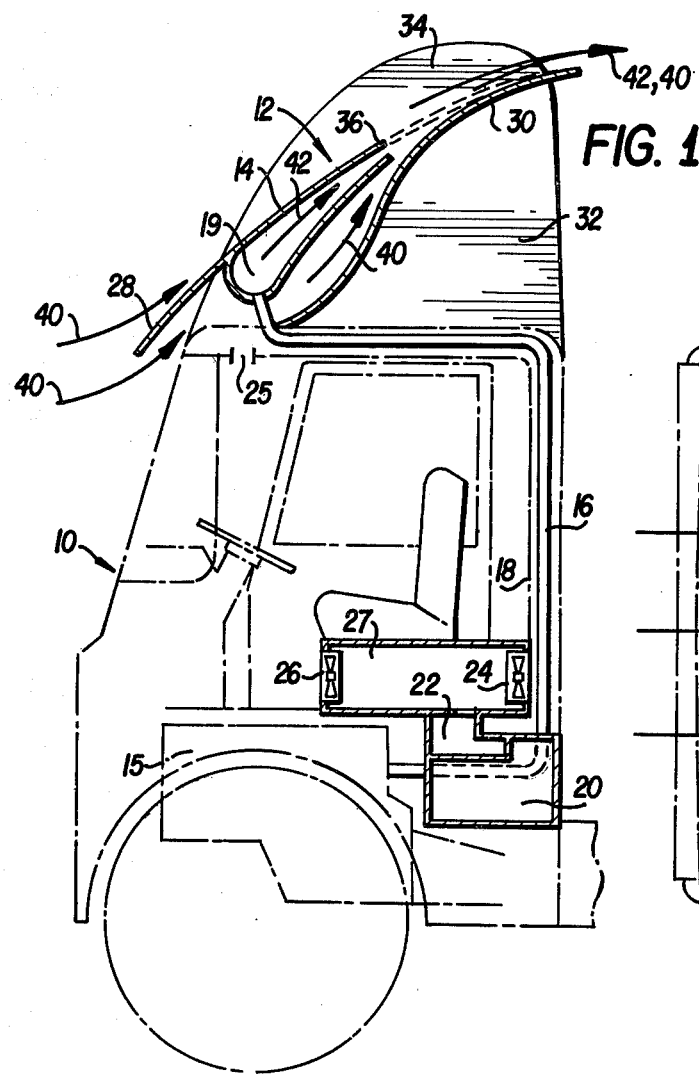
FIG. 1 shows a sectional side view of a tractor equipped with a silencer according to the present invention.

Referring to FIG. 1, the roof of tractor 10 is equipped with airfoil-silencer assembly 12, which includes silencer 14. The interior 19 of the silencer is in communication with engine 15 of the tractor through exhaust pipe 16, which passes through duct 18 in the cab of the tractor. The duct preferably is internally lined with a heat reflective material and thermally insulated. The duct forms part of a cab heater system, which includes air inlets 25, fan 24, heat-cold sink 27 (preferably ceramic) and fan 26. Fan 26 is a low speed fan for drawing air through the sink 27. The exhaust passes to heat pump 20, and then to exhaust pipe 16. The heat pump may be engageable to function as part of an air conditioner 22, which provides cold air to the cab interior through the heat-cold sink. In operation, exhaust gas from engine 15 passes through heat pump 20, and then through exhaust pipe 16 to the interior 19 of the silencer 14. The silencer is part of the airfoil assembly 12. The heat-cold sink eliminates the necessity of running the engine to provide climate control when the vehicle is stationary, for example, when the driver is taking a rest. At this time, the low speed fan 26 would be used to draw air through the sink.

Figure 3:
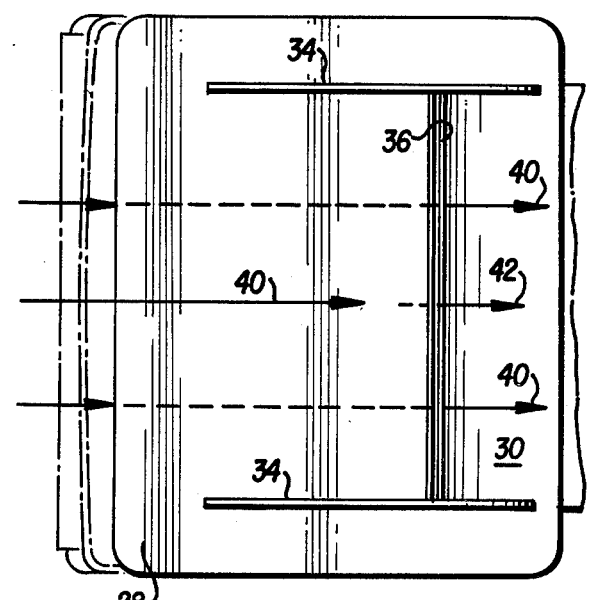
FIG. 3 shows a top view of the tractor of FIG. 1.
Figure 2:
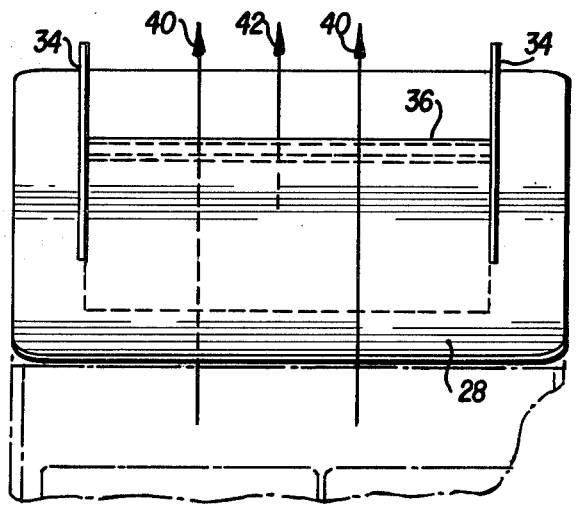
FIG. 2 shows a partial front view of the tractor of FIG. 1.
Figure 4:
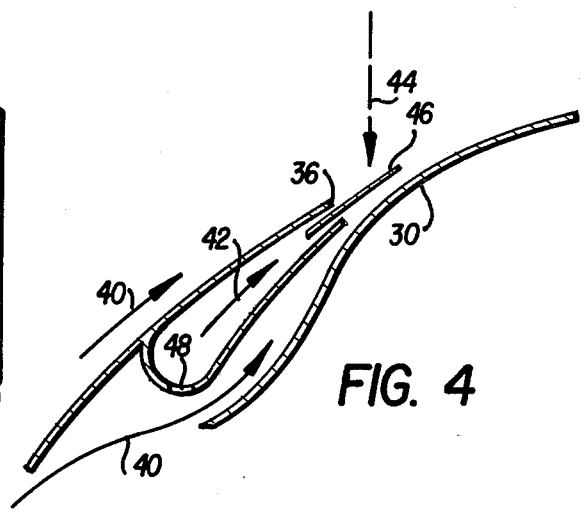
FIG. 4 shows a detailed sectional side view of the silencer.

Referring also to FIGS. 2-4, the airfoil assembly on the cab roof includes silencer 14, a sheet element 30 extending beneath and behind the silencer and vertical structural elements 32. The vertical structural elements 32 are extended beyond the sheet element 30 to form fins 34. Silencer 14 extends between the fins 34, and is provided with an elongate discharge aperture 36 at its trailing edge. Optionally, the leading edge 28 of the silencer, which serves as an air scoop also may function as a transparent sun visor. Discharge 36 may be provided with a divider 46 if desired. Rain 44, entering the silencer, escapes through weep hole 48.

In operation, air 40 flowing past the vehicle passes over the silencer and between the silencer and the sheet element 30. Air 40 extracts and mixes with exhaust gas 42, which passes through the elongate discharge aperture 36. The airfoil assembly is used to regulate the flow of air past the payload portion of a truck, tractor-trailer, bus etc. Wiper and washer assemblies may be mounted on the airfoil assembly to provide cleaning for that portion of the assembly directly downstream of the discharge aperture 36.

The method of using exhaust gas heat energy to provide climate control to the cab interior also may be used to provide climate control to the payload compartment. If more energy than can be supplied by the exhaust gas is necessary, additional energy can be provided through photovoltaic cells mounted on the roof of the vehicle. It is contemplated that the high level gas extractor mounting in combination with airfoil function may be used in cars, boats, railed vehicles and light aircraft.

What I claim is:

1. A vehicle, comprising:
    a body having a roof;
    an engine within said body;
    an exhaust pipe for carrying exhaust from said engine; said exhaust pipe extending to the roof of said body; and
    means for regulating air flow past a payload pulled by said vehicle, comprising an airfoil-shaped silencer in fluid communication with said exhaust pipe, above said roof, having a leading edge and a trailing edge higher than said leading edge, said trailing edge including an elongate discharge aperture extending in the direction of the width of said vehicle.

2. A vehicle as claimed in claim 1, wherein said means for regulating air flow comprises vertical first and second structural elements, extending in the direction of the length of said vehicle, said silencer being secured between said first and second structural elements.

3. A vehicle as claimed in claim 1, wherein said elongate aperture is fitted with a divider.

4. A vehicle as claimed in claim 1, wherein the bottom of said silencer has a weep hole.

5. A vehicle as claimed in claim 1, wherein said exhaust pipe extends through the body of said vehicle, said exhaust pipe being enclosed in a duct in said vehicle.

6. A vehicle as claimed in claim 5, further comprising a heat-cold sink in said vehicle, for storing heat from said exhaust pipe.

7. A vehicle as claimed in claim 1, wherein the leading edge of said silencer is transparent and extends beyond the front of said vehicle.

8. A vehicle as claimed in claim 1, wherein said means for regulating airflow further comprises a sheet element spaced from and extending beneath and behind said silencer, having a front end and a rear end higher than said front end.

* * * * *